US006325937B1

(12) United States Patent
Carlsson et al.

(10) Patent No.: US 6,325,937 B1
(45) Date of Patent: *Dec. 4, 2001

(54) PROCESS AND MEANS FOR DOWN STREAM PROCESSING

(75) Inventors: Mats Carlsson, Bälinge; Jan-Gunnar Gustafsson, Uppsala; Per Hedman, Upplands Väsby; Per-Åke Pernemalm, Uppsala; Jörgen Lönngren, Uppsala; Annika Lindgren, Uppsala, all of (SE)

(73) Assignee: Amersham Pharmacia Biotech AB, Uppsala (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/035,354

(22) Filed: Mar. 5, 1998

Related U.S. Application Data

(62) Division of application No. 08/664,926, filed on May 31, 1996, now abandoned, which is a division of application No. 08/412,743, filed on Mar. 29, 1995, now Pat. No. 5,522,993, which is a continuation of application No. 07/956,776, filed as application No. PCT/SE92/00255 on Apr. 16, 1992, now abandoned.

(30) Foreign Application Priority Data

Apr. 17, 1991 (SE) ................................... 9101149

(51) Int. Cl.⁷ .................................. B01D 15/08

(52) U.S. Cl. ....................... 210/635; 210/656; 210/198.2

(58) Field of Search .................... 210/635, 656, 210/659, 661, 198.2, 502.1

(56) References Cited

U.S. PATENT DOCUMENTS

| 3,335,017 | 8/1967 | Miles | 210/656 |
| 3,493,497 | 2/1970 | Pretorius | 210/656 |
| 3,510,271 | 5/1970 | Emmeus | 210/198.2 |

(List continued on next page.)

FOREIGN PATENT DOCUMENTS

| 0021267 | 1/1981 | (EP) | 210/198.2 |
| 0007783 | 2/1981 | (EP) | 210/198.2 |
| 0025309 | 3/1981 | (EP) | 210/198.2 |

(List continued on next page.)

OTHER PUBLICATIONS

Snyder, Introduction to Modern Liquid Chromatography, 1979, John Wiley & Sons, Inc. pp. 170–171.*
*Journal of Chromatography*, 128 (1976) 125–131 "Preparation of Silica–Agarose Beads for Gel Chromatography" Pertoft & Hallen.
*J. Chem. Tech. Biotechnol.* 1987, 40, 33–40 "Aerosol–jet Produced, Magnetic Carrageenan–gel Particles: A New Affinity Chromatography Matrix" Lochmuller et al.
*Separation Science and Technology* 22, (11) pp. 2111–2195 (1987) "Affinity Separations in Magnetically Stabilized Fluidized Beds: Synthysis and Performance of Packing Materials" Lochmuller & Wigman.
Verrall et al, "*Separations for Biotechnology*"(1987) Ellis Horwood Ltd.. Chapter 13, pp. 193–199. "Macrosorb kieselguhr–agarose composite adsorbents: new tools for downstream process design and scale–up" Bite et al.

(List continued on next page.)

Primary Examiner—Ernest G. Therkorn
(74) Attorney, Agent, or Firm—Oblon, Spivak, McClelland, Maier & Neustadt, P.C.

(57) ABSTRACT

Support beads for downstream processing comprising a polymer, esp. a polysaccharide, matrix into which glass or silica particles, preferably quartz particles, have been incorporated, and their use in downstream processing, especially stabilized fluidized bed separations.

26 Claims, 1 Drawing Sheet

U.S. PATENT DOCUMENTS

| | | | |
|---|---|---|---|
| 3,983,299 | 9/1976 | Regnier | 210/656 |
| 4,110,164 | 8/1978 | Sutthoff et al. | 210/656 |
| 4,111,838 | 9/1978 | Schaeffer | 210/656 |
| 4,112,185 | 9/1978 | Meiller | 428/403 |
| 4,143,201 | 3/1979 | Miyashiro et al. | 210/198.2 |
| 4,308,254 | 12/1981 | Tayot et al. | 424/124 |
| 4,336,161 | 6/1982 | Rosevear | 210/656 |
| 4,543,733 | 10/1985 | Siegell | 210/656 |
| 4,624,789 | 11/1986 | Fan | 210/661 |
| 4,648,969 | 3/1987 | Swanson | 210/661 |
| 4,655,796 | 4/1987 | Pirkle | 210/661 |
| 4,668,379 | 5/1987 | Rosenweig | 210/656 |
| 4,675,105 | 6/1987 | Martin | 210/656 |
| 4,675,113 | 6/1987 | Graves | 210/656 |
| 4,756,834 | 7/1988 | Muller | 210/656 |
| 4,780,113 | 10/1988 | Koslow | 210/661 |
| 4,789,479 | 12/1988 | Onitsuka | 210/635 |
| 4,846,786 | 7/1989 | Freed | 210/656 |
| 4,859,342 | 8/1989 | Shirasawa | 210/659 |
| 4,861,705 | 8/1989 | Margel | 210/661 |
| 4,937,001 | 6/1990 | Bellouis | 210/661 |
| 4,976,865 | 12/1990 | Sanchez | 210/656 |
| 5,013,446 | 5/1991 | Li | 210/661 |
| 5,021,162 | 6/1991 | Sakamoto | 210/198.2 |
| 5,034,133 | 7/1991 | Naveh | 210/656 |
| 5,053,135 | 10/1991 | Boschetti | 210/656 |
| 5,055,194 | 10/1991 | Goetz | 210/656 |
| 5,084,184 | 1/1992 | Burns | 210/656 |
| 5,102,986 | 4/1992 | Coffey | 210/661 |
| 5,141,635 | 8/1992 | LePang | 210/656 |
| 5,145,579 | 9/1992 | Eguchi | 210/635 |
| 5,230,805 | 7/1993 | Yates | 210/661 |
| 5,234,991 | 8/1993 | Tayot | 210/656 |
| 5,240,856 | 8/1993 | Goffe | 210/656 |
| 5,522,993 * | 6/1996 | Carlsson | 210/198.2 |
| 5,866,006 | 2/1999 | Lihme et al. | 210/198.2 |
| 5,935,442 | 8/1999 | Lihme et al. | 210/198.2 |

FOREIGN PATENT DOCUMENTS

| | | | |
|---|---|---|---|
| 0047518 | 3/1982 | (EP) | 210/198.2 |
| 0047617 | 3/1982 | (EP) | 210/198.2 |
| 0074221 | 3/1983 | (EP) | 210/198.2 |
| 0088404 | 9/1983 | (EP) | 210/198.2 |
| 0140572 | 5/1985 | (EP) | 210/198.2 |
| 0410572 | 5/1985 | (EP) | 210/198.2 |
| 0175568 | 3/1986 | (EP) | 210/198.2 |
| 0266580 | 5/1988 | (EP) | 210/198.2 |
| 0328256 | 8/1989 | (EP) | 210/198.2 |
| 1 577 956 | 10/1980 | (GB) | 210/198.2 |
| 2 085 614 | 4/1982 | (GB) | 210/198.2 |
| 2 196 252 | 9/1988 | (GB) | 210/198.2 |
| 50059292 | 5/1975 | (JP) | 210/198.2 |
| 52114510 | 9/1977 | (JP) | 210/198.2 |
| 409822 | 9/1979 | (SE) | 210/198.2 |
| 444268 | 4/1986 | (SE) | 210/198.2 |
| 81/02844 | 10/1981 | (WO) | 210/198.2 |
| 86/03136 | 6/1986 | (WO) | 210/198.2 |
| 87/07851 | 12/1987 | (WO) | 210/198.2 |
| 89/8500 | 9/1989 | (WO) | 210/198.2 |
| WO89/8500 | 9/1989 | (WO) | 210/198.2 |
| 90/14157 | 11/1990 | (WO) | 210/198.2 |
| 92/00799 | 1/1992 | (WO) | 210/198.2 |

OTHER PUBLICATIONS

Verrall et al, *"Separations for Biotechnology"* (1987) Ellis Horwood Ltd.. Chapter 16, pp. 217–224. "Liquid fluidised bed adsorption in biological recovery from biological suspensions" Wells et al.

*I. Chem E. Symposium Series* No. 118 (1990) 161–172 "Protein Adsorption in Liquid Fluidized Beds" Draeger & Chase.

*Trans I ChemE*. vol 69. Part C. (Mar. 1991) 45–52 "Liquid Fluidized Beds for Protein Purification" Draeger & Chase.

*Bioseparation* 2: 67–80 (1991) "Liquid fluidized bed adsorption of protein in the presence of cells" Draeger & Chase.

Hawley, The Conclensed Chemical Dictionary, Van Nostrand New York 1971, pp. 274, 497, & 782.*

* cited by examiner

PROCESS AND MEANS FOR DOWN STREAM PROCESSING

This application is a division of application Ser. No. 08/664,926 filed May 31, 1996, now abandoned, which in turn was a division of application Ser. No. 412,743 filed Mar. 29, 1995 (now U.S. Pat. No. 5,522,993), which in turn was a continuation of application Ser. No. 956,776 filed May 3, 1993 now abandoned, which, in turn, is a 371 of PCT/SE92/00255 filed Apr. 16, 1992, which was published as WO 92/18237.

The present invention is related to the field of separations in fluidized beds and to beads of a polymer, especially a polysaccharide, into which glass or silica particles, especially quartz particles have been incorporated, and the use of these beads as carrier matrices in stabilized fluidized bed systems, which are characterized by having a low extent of axial dispersion.

It is known that solid entities may be kept suspended above a solid support by bringing the solid entities into a fluid medium (gas or liquid) which is flowing in opposite direction relative to the gravitational field. A number of particles placed in such a stream of flowing medium in a confined space, such as a cylindrical vessel (column), is commonly referred to as a fluidized bed provided that the particles stay resident in the confined space. This is achieved by balancing the gravitational force versus the frictional, lifting force, exerted by the fluid stream on the solid particles.

Fluidized beds haste been used as an efficient means of bringing solid particles in contact with a fluid phase. The relatively high fluid velocities, relative to the particles, allow for efficient mass and heat transfer. Consequently, fluidized beds have been used for combustion and for adsorption processes. Fluidized beds have also been used for culturing of microbial plant or animal cells in so called air-lift reactors. In this case nutritients and dissolved oxygen are brought to the cells and waste products are removed from the cells efficiently because of the efficient mass transfer.

Minor irregularities in the flow field in a fluidized bed cause translational movements of the particles. Over a certain time, there is the same-probability that a certain particle may be found at any position within the confined space of the fluidized bed. Here, this effect is referred to as back-mixing or a large degree of axial dispersion. The back-mixing is advantageous when it is desirable to achieve a homogeneous composition of the fluid and solid phases in the entire fluidized bed. However, for adsorption processes, a homogeneous composition is not necessarily advantageous.

In fact, it is possible to obtain a lower concentration of a solute in the effluent fluid if there is no back-mixing than there is with back-mixing in the confined space of the fluidized bed.

In order to prevent complete back-mixing, it has been shown (Buijs (1980)) that screens inserted into the fluidized bed result in a compartmentalization of the bed.

The density, viscosity and the velocity of the fluidium and the diameter and density of the solid entities affect the balancing of frictional versus gravitational forces (Lydersen (1979)). Much lower fluid velocities must be used with liquids than with gases because of the higher densities and viscosities of liquids. In order to reduce mass transfer resistances and to increase through-put (the liquid feed-rate) one may wish to use higher flow rates than those which may be balanced by the gravitational field only. This is possible by applying a third force onto the solid entities. The latter force may be induced by a magnetic field applied to a bed containing ferro- or paramagnetic particles. Such magnetically stabilized fluidized beds have been described (see for instance Burns (1985:1 and 1985:2)). The heat generated by such a system for stabilizing the bed is a clear disadvantage and makes the method less useful especially in temperature sensitive biomolecular systems, even if various cooling systems are available. The need for equipments for generating a magnetic field and for cooling the system increases the process costs considerably.

Particles with relatively lower density and diameter move upwards in the fluidized bed. Consequently, it is possible to feed an unclarified liquid into a fluidized bed containing large diameter and/or high density adsorbent particles without accumulation of solids from the feed in the fluidized bed. The relatively smaller and/or less dense particles originating from the feed stream will be washed out with the effluent provided that the liquid flow-rate is chosen properly. Thus it is possible to improve an adsorptive recovery process starting with an unclarified feed by using a fluidized bed since time, costs and yield reduction caused by a clarification step are avoided. However, since a fluidized bed is back-mixed (unless it is stabilized in some way) the bed is a less efficient adsorber than a packed bed due to the larger axial dispersion in the former. A second reason why the packed bed is more efficient as an adsorber is that the packed bed acts as a multi-step adsorber.

A single step adsorber, such as a fluidized bed, may, on theoretical grounds, be expected to work efficiently if the adsorbing sites have a high binding affinity for a solute, relative to the concentration of the solute in the feed stream. The systems described so far for carrying out separations in a fluidized bed, however, do not fulfil all the demands raised by the users. One problem so far has been that since the beds are not stabilized, flow channels through the bed are easily created, in which the sample molecule might pass with only little chance to be bound.

The beads should be relatively small to allow short diffusion distances, have high density, controlled high sedimentation velocity, being an easily derivatized hydrophilic polymer suitable for applications involving biomolecules.

We have now unexpectedly found that beds may be designed, which combine the advantageous properties of packed beds and fluidized beds. In one aspect of the invention beds are provided,which allow relatively less dense and/or relatively smaller particles to pass through the bed with the upward flowing liquid stream since the particles are not packed close together.

By using bead particles covering a given size and/or density interval the particles are kept from moving around in the confined space of the bed such that, for a certain particle the probability to find it in a certain position is high only in a limited volume being a minute fraction of the total bed volume. By keeping, the particles resident locally, back-mixing is prevented, thereby reducing axial dispersion and allowing for multistep adsorption without insertion of screens or similar devices.

Furthermore, the beads of the invention are kept suspended in upward flowing liquids without the need for application of heat generating magnetic fields or use of ferro- or paramagnetic additives to the adsorbent particles. In the following the beds achieved when using the actual particles are referred to as stabilized or unmixed expanded beds, which are characterized by having negligible axial dispersion. The axial dispersion is often expressed by the vessel dispersion number (for a definition see Levenspiel (1972)) which in a stabilized bed should be less than about $75 \times 10^{-3}$, and especially less than $20 \times 10^{-3}$.

The beads according to the invention comprises a polymer matrix into which glass or silica particles, preferably quartz particles are incorporated. The beads may be porous as well as non-porous. The diameter is 100–1000 µm, preferably 100–500 µm, and spherical beads as well beads of an irregular shape may be used, even if spherical beads are preferred as discussed below. The density of the beads is typically 1.10–1.50 g/ml, for instance around 1.15 g/ml (the values are given for hydrated beads).

The polymer is synthetic, for instance from mono- or polyvinyl monomers like acrylates, methacrylates or vinylbenzenes, or of natural origin, preferably a polysaccharide, for instance agarose, starch, cellulose or derivatives of these, optionally crosslinked for the desired rigidity and pore distribution.

The glass or silica particles to be incorporated are preferably in the range of from 1–100 µm and may be spherical as well as of an irregular shape. The amount of silica particles incorporated into the polymer particles is in the range of from 5–50% of the weight of the wet final particle. In a preferred embodiment of the invention quartz particles are utilized.

One important characteristic of a carrier matrix to be used in down stream processing is that it is stable to the various solutions used for instance in reconditioning steps. Several applications require a strongly alkaline medium to be used for reconditioning and this has been found to be fatal to the prior art carrier matrices earlier tested. Especially in cases when the flow through the bed during the elution step is reversed to give a packed bed, even minor changes of the support matrix might cause serious problems resulting in lower yields, etc. In this elution technique spherical beads are preferred for improved elution capability. The reasons for this are well known to those skilled in the art.

In this aspect of the invention the beads are used in a separation system of the type schematically shown in FIG. 1, especially adopted for recovery of products from a culture medium, including for instance cell wall particles and other waste products after lysis of the bacteria or other hosts that have been used.

The major components of the system are: pumps P1–P3 (supplying the appropriate solutions), valves V1–V3, sample container S, column C, containing a flow distributor D at the bottom and an adjustable upper adapter (not shown), and a fraction collector FC.

Figure 1A:
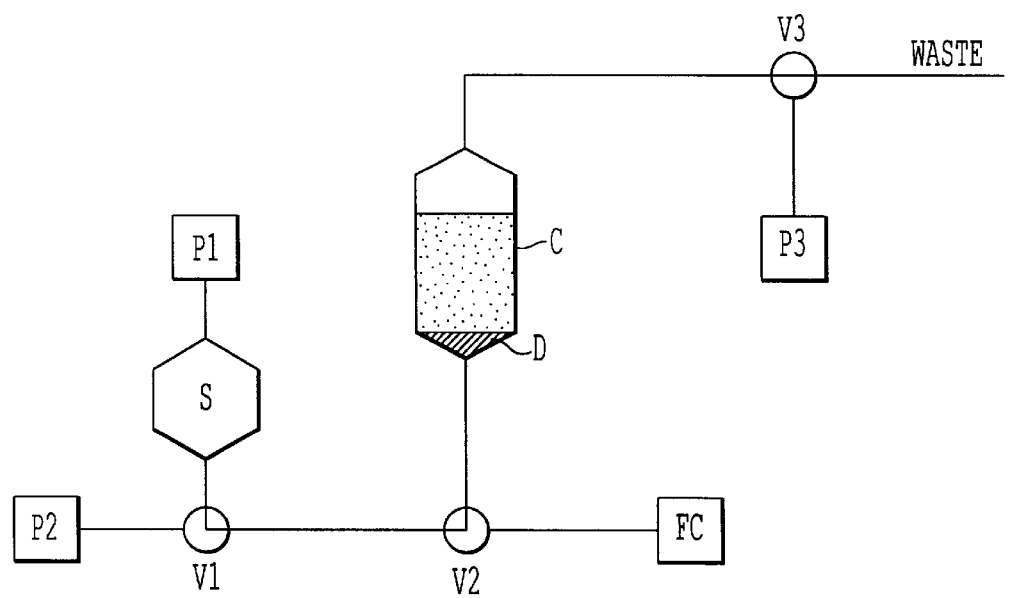
FIG. 1A shows the system in the fluidized bed mode during which the desired component is bound to the gel and separated from other components.

FIG. 1a shows the system in the fluidized bed mode during which the desired component is bound to the gel and separated from other components. A solution is pumped by P2 into the column, containing the beads, which have been derivatized to bind the component to be purified, for creating a stabilized fluidized bed and for creating appropriate conditions with regard to pH, ionic strength, etc. The outflow from the column is connected to waste. The valve V1 is next switched so that the sample solution is pumped by P1 into the column, under conditions so that a Stabilized fluidized bed is maintained. When the sample has been transferred to the column, valve V1 is switched so that a washing solution (via P2) is fed into the column. After the fluidized bed has been thoroughly washed, and unbound components like cell particles etc have been eluted to waste through the top of the column, the first phase of the procedure is finished.

Figure 1B:
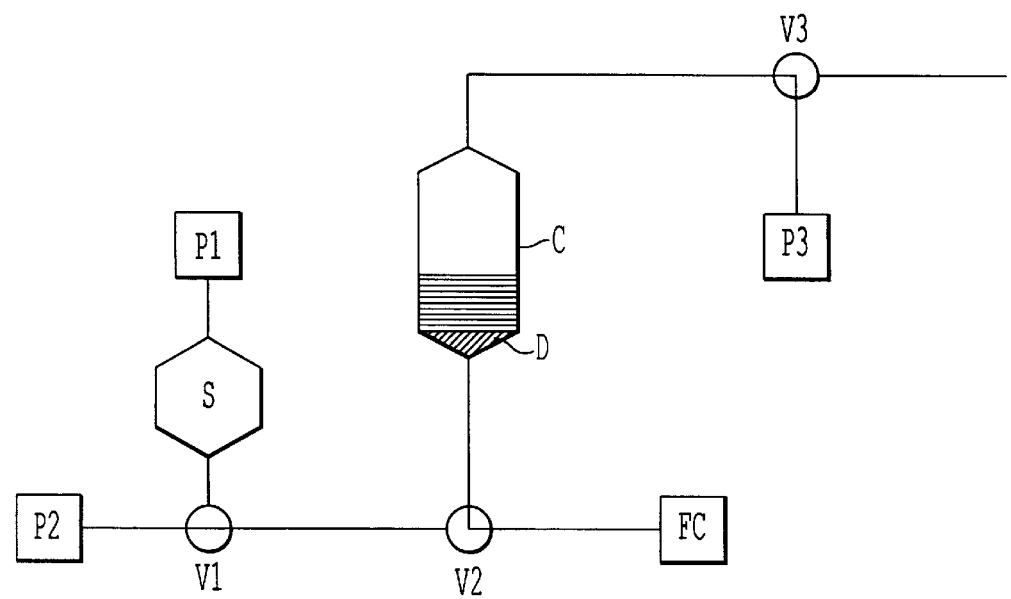
FIG. 1B shows the flow through the column when it is reversed for the elution of the bound sample components.

In FIG. 1b the flow through the column is reversed for elution of the bound sample components. The valves have been switched so that the flow is from P3 via the column to the fraction collector FC. After the bed has been allowed to settle, and optionally further converted to a packed bed by moving the upper adapter down to the bed surface, a suitable elution solution is via P3 introduced into the bed whereby the desired component is released and collected. The upper adapter, which is of the traditional type found in a great number of columns for chromatography, is adjustable to a desired position in the column and contains a net to prevent beads to pass.

In an alternative embodiment of the invention elution of the column is carried out in the fluidized mode by introducing the elution solution via pump P2 into the column and collecting the sample constituents released from the beads with a fraction collector connected to the upper outlet of the column (replacing waste in FIG. 1a). In this case there is no need for a movable upper adapter in the column.

Of crucial importance for obtaining the stabilized beds of the invention is the way the solution is introduced into the column. The solution must be equally distributed over the cross sectional area of the column and in order to achieve this a distributor is utilized. The distributor could typically be a perforated plate on the upper side (the gel bed side). It need not to be mentioned that the holes in the plate must be great enough to allow all sample constituents to pass or otherwise clogging would disturb the procedure. The pressure drop over D must for each combination of flow velocity, viscosity, particle size etc, exceed a given value since otherwise flow channels with low flow resistance and accordingly high flow are created in the bed. The ratio between the pressure drop over the distributor and the bed should therefore exceed 3% and preferably 10%, with much higher values, such as up to 50%, 500% and even 2000% being typical in an optimized system. The total cross sectional area of the holes is typically about 0.005 to 10%, especially 0.005 to 3%, of the total area of the plate. If a conical distributor is used the need for a certain pressure drop in the distributor is less pronounced for obvious geometrical reasons and values below those indicated above are accessible.

The dimensions of a column to be used in a process according to the invention cover a broad range of values, for instance a diameter from 1 cm up to 1–2 meters and a length of about 10 cm to 10 meter, depending on the type of separation to be carried out and on what scale it is to be done. An important finding is that considerably shorter columns can be used in the stabilized fluid bed process compared to the non-stabilized prior art systems. The process is accessible for flow velocities around at least 50–3000 cm/h, even if values of about 100–500 cm/h are most frequently used. During elution the flow is normally 5–500 cm/h, and in particular 50–200 cm/h.

The method can as mentioned above be used in systems containing also solid particles like precipitates and cell wall constituents from cell culture media. In traditional chromatographic systems this type of impurities requires one or more prepurification step. This is accordingly one of the major advantages of the claimed method in that bacteria or yeast homogenates as well as blood, urine etc from humans or animals can be introduced directly into the column.

It has been found that in systems containing considerable amounts of particulate impurities clogging might occur in the upper adapter. This can easily be avoided if the flow through the column is occasionally reversed during the adsorption phase. An intermittent flow reversal of about 10–20 seconds every 15th minute has been found to eliminate the problem.

In a typical example a culture medium with a pH value of about 7 and containing immunoglobulins is fed as illustrated in FIG. 1a to a column containing beads derivatized with protein A which will bind IgG. Waste components, including particles, are washed away with a neutral buffer, the flow is reversed and when the packed bed has been formed, the pH of the elution buffer is decreased to about 3 and IgG is eluted through the bottom of the column, in the mode illustrated in FIG. 1b.

The invention is accordingly in one aspect related to support beads for use in down stream processing, such as fluidized bed separations, comprising a polymer matrix, into which silica particles have been incorporated. The polymer is preferably a polysaccharide, for instance agarose, starch, cellulose or derivatives of these, optionally crosslinked for the desired rigidity and pore distribution. The beads are in the range of from 100–1000 $\mu$m, preferably 100–500 $\mu$m and with glass or silica incorporated into the polymer particle in the range of 5 to 50% of she weight of the wet final particle. The silica material used is for instance quartz, the latter being preferred at the moment. The invention is further related to the use of such beads in an expanded fluid bed system for separating various components from a liquid containing the desired component.

When preparing the agarose base matrix material which is the at present preferred bead matrix, an agarose solution containing the quartz particles is emulgated in the presence of a thickening additive, as further exemplified below.

The emulsifying agent should be a low molecular weight surface active compound and could be ionic or nonionic, for instance Span 20, Gafen LB-400 or another agent known in this art.

The thickening agent should be soluble in the dispersion medium and could be selected among hydrophobic polysaccharide derivatives. The preferred agent at the moment is ethyl cellulose.

In order to further stabilize the beads the polymer chains in the beads may preferably be crosslinked in a manner known per se. In case a polysaccharide like agarose is used the beads could for instance be suspended in a solution containing a crosslinking agent like a bisepoxide or a halohydrin under conditions to give crosslinking of adjacent chains in the agarose matrix (Porath (1971)).

Agarose beads, as well as crosslinked agarose beads, have been used in a great number of chromatographic applications and there is an extensive literature describing various methods for derivatizing the beads for use in ion exchange chromatography, affinity chromatography, etc. These methods are obvious choices for preparing supports for specific applications. One such example is binding of protein A or protein G to the agarose matrix by the cyanogen bromide method for preparing a support for purification of IgG.

The invention is in another aspect related to a method for separating sample components by the use of a stabilized fluidized bed.

The method comprises the steps of
  loading a column for fluidized liquid bed processes with bead particles derivatized to bind a desired component,
  conditioning the particles with a solution under conditions so that a stabilized fluidized bed is created,
  feeding the so stabilized fluidized bed with a sample solution containing the desired component through a bottom port of the column, whereby the desired component is bound to the beads and impurities of the sample solution are discharged through the top port of the column,
  washing the column with a solution introduced through said bottom port under flow conditions maintaining the expanded bed, whereby remaining unbound components of the sample solution are discharged through the top port of the column,
  introducing an elution solution into the column for releasing the bound sample constituents from the beads and collecting them, optionally by using a fraction collector.

In one embodiment of the invention the elution step is carried out by introducing the elution solution through the bottom port of the column and maintaining the bed in an expanded bed mode.

In another embodiment the gel bed is packed by applying an inlet flow of an appropriate conditioning buffer through the upper port of the column, and by moving down an upper adapter to the gel surface. This buffer should of course not be allowed to release the desired component from the beads. The elution solution is then introduced through the upper port of the column, the sample constituents are released from the beads and finally collected in the outflow from the bottom port of the column.

The advantages of using this method are readily appreciated in cases when one or more components from cell culture experiments are to be separated from other constituents of the medium. Solid cell particles, which would cause clogging of a packed bed can easily be removed from the system during the fluidized bed phase of the procedure and will not at all interfere.

The invention will now be illustrated by a series of examples.

EXAMPLE 1

Synthesis of Crosslinked Agarose Beads Containing Quartz Particles 10 g/100ml, 6% Agarose Bead Formation.

An agarose solution was prepared by stirring 57 g of agarose in 900 ml water at 90° C., until the agarose was dissolved and the viscosity of the solution was in the range of 250–700 cPs at 85° C.

To the stirred agarose solution 90 g of quartz particles (10–70 $\mu$m, NGQ 200, Ernstroms, Sweden) was added. The slurry was poured into a solution of 45 g ethyl cellulose (N-50, Hercules, USA) in 1000 ml of toluene, at 60° C., in a cylindrical vessel equipped with a stirrer at 100–200 rpm. Approximately 20 ml of Gafen LB 400 (Gaf,USA) in toluene (1:2, w/v) was gradually added to give the desired bead size. The stirred suspension was cooled to room temperature and 1000 ml water was added. The mixture was left over night and the upper liquid phase was removed. The beads were washed with toluene, with water and finally wet sieved to yield a size distribution of 125–315 $\mu$m.

Crosslinking.

Crosslinking with epichlorohydrin was essentially performed as described by Porath et al (1971).

EXAMPLE 2

Synthesis of Agarose Beads Containing Quartz Particles. 13 g/100 ml, 4% Agarose

To a stirred agarose solution, prepared as in Example 1 but with 12 g of agarose in 300 ml water, 40 g quartz (10–70 $\mu$m, NGQ 200, Ernstroms, Sweden) was added. The slurry was suspended in a stirred solution of 25 g ethyl cellulose (N-50, Hercules, USA) in 350 ml toluene, at 60° C. After one hour the suspension was allowed to reach room temperature. The quartz containing agarose beads were washed, wet sieved and crosslinked as above.

EXAMPLE 3

Synthesis of Agarose Beads Containing Quartz Particles. 17 g/100 ml, 6% Agarose

A slurry of quartz in agarose solution was prepared as in Example 2, but with 28 g agarose in 450 ml water and with 75 g quartz. The suspension was suspended in a solution of 500 ml toluene and 50 g ethyl cellulose and stirred for 3 hours at 60° C. After cooling to room temperature, the beads were washed, wet sieved and crosslinked as above.

EXAMPLE 4

Synthesis of Agarose Beads Containing Quartz Particles. 33 g/100 ml, 6% Agarose

Prepared as in Example 3 but with 150 g quartz particles.

EXAMPLE 5

Synthesis of Crosslinked Dextran Beads Containing Quartz Particles

To a stirred solution of 16 g dextran (Mw 250 000), 3,5 g sodium boro hydride and 1,6 g sodium hydroxide in 40 ml water, 3 g quartz particles (10–45 $\mu$m, NGQ 325, Ernstroms, Sweden) were added. The slurry was added to a stirred solution of 3 g Gafen LB 400 and 3 g ethyl hydroxyethyl cellulose (EHEC-XH, Hercules) in 75 m toluene in a round bottom flask equipped with a blade stirrer at 500 rpm. The stirred suspension was heated to 50° C. and 8 ml epichlorohydrin was added. The suspension was kept at 50° C. over night. The quartz containing beads were then washed with ethanol and finally with slightly acidic water and wet sieved as above.

EXAMPLE 6

Synthesis of Porous Divinyl Benzene Beads, Containing Quartz Particles

Silanization of Quartz Particles:

A slurry of 40 g quartz particles (10–70 $\mu$m, NGQ 200. Ernstroms, Sweden) in 200 ml, 1 M sodium hydroxide was heated at 90° C. for 3 hours. The cooled slurry was filtered and the quartz was washed with water and dried. The quartz particles were transferred to 140 ml toluene and 6,25 g imidazol was added. The stirred slurry was heated to 100° C. and 16,6 g dimethyloctadecylchlorosilane was added. The slurry was maintained at 100° C. over night and then cooled and filtered. The silanized quartz particles were washed with acetone, water and finally acetone and dried at room temperature.

Suspension Polymerisation

A solution of 5 g polyvinyl alcohol (Mowiol 40–88, USA) in 100 ml water was mixed with a solution of 15 g dextran (Mw 40 000) in 150 ml water. To the stirred solution a slurry of 0,5 g benzoyl peroxide, 25 ml divinylbenzene, 25 ml 4-methyl-2-pentanol and 4 g silanized quartz was slowly added and kept at 75° C. for 6 hours. The cooled suspension was filtered and the quartz containing divinyl benzene beads were washed with alcohol and finally with water.

EXAMPLE 7

Sedimentation of Agarose Particles with and without Quartz Particles

In this experiment various gels were loaded on a column suitable for fluidized bed experiments and the height of the gel bed was measured at various flow rates.

Gel 1: (125–280 $\mu$m) is an agarose gel synthesized as in Example 1 but without addition of quartz. It has further been derivatized to contain sulphonate groups which however is of no importance in the actual experiments.

Gel 2: (122–250 $\mu$m) is a quartz-containing agarose gel synthesized as in Example 1. The quartz contents was 17 g of quartz per 100 ml of agarose and it was further derivatized to contain diethylaminoethyl (DEAE) groups.

Gel 3: (125–280 $\mu$m) is a gel containing 33 g of quartz per 100 ml of agarose and was synthesized as Gel 2.

Each gel was loaded on a column (50×600 mm) and the height of the bed was measured. A flow of 10 ml/ml was applied and the height of the now expanded bed was measured after it had stabilized. The flow was increased in steps of 10 ml/min and the subsequent bed height was measured. The results showed that it was possible to apply considerably higher flow velocities using the beads of the invention and still working under stabilized fluidized bed conditions.

EXAMPLE 8

Purification of a Recombinant Anticoagulant Protein from an *E. Coli* Homogenate.

An *E.coli* strain expressing the anticoagulant protein annexin V was grown in a complex nutrient medium in a fermentor. After harvest the cells were pelleted, resuspended in water and passed three times through a high pressure homogenizer. Triton X-100 was added to 0.5% final concentration and the pH was adjusted to 5.5 using acetic acid.

An expanded bed column (50 mm diameter, 60 cm high) was filled to 11.5 cm (225 ml) with quartz containing agarose beads, according to the present invention, which were charged with diethylaminoethyl (DEAE) groups. The gel bed was expanded to 30 cm at 300 cm/h linear flow rate in equilibration buffer; 30 mM ammonium acetate, pH 5.5. At the same flow rate, 1600 ml of the *E. coli* homogenate was applied. The gel bed was then washed with equilibration buffer and equilibration buffer containing 80 mM NaCl, at 400 cm/h. The flow rate was then decreased to 200 cm/h and the flow direction reversed in order to pack the gel. The upper adapter was moved down to the bed surface and bound proteins were eluted with equilibration buffer containing 250 mM NaCl at 100 cm/h. According to anticoagulant activity assays 80% of the applied annexin V was bound and eluted from the gel.

This purification was also successfully repeated in a pilot scale expanded bed column (200 mm diameter, 95 cm high) containing 3.1 liter gel. The sample volume was 8 liter. Example 9. Characterization of the fluidized bed stability.

An expanded bed column (50 mm diameter, 60 cm high) containing a distributor with a hole area of about 3% of the total area, was filled to 6.0 cm (118 ml) with quartz containing agarose beads with a particle distribution in the range of from 100 to 270 $\mu$m. The gel was expanded to 30 cm at 300 cm/h linear flow rate in distilled water. The pressure drop over the distributor was 66% of the pressure drop in the bed.

A pulse input of 32 ml acetone solution with a concentration of 0.25% was injected into the column as a tracer in a "stimulus response experiment" (see Levenspiel (1972)). The result expressed as the "vessel dispersion number" defined from the model "Dispersion model for small extents of dispersion" was $19 \times 10^{-3}$ (for definitionssee Levenspiel (1972))

References.

Buijs et al (1980) "Batch fluidized ion exchange column for streams containing suspended particles, Journal of Chromatography 201, page 319–327.

Lydersen (1979), Fluid Flow and Heat Transfer, John Wiley & Sons Ltd, Chichester, page 134–136.

Burns et al (1985:1) "Continuous Affinity Chromatography using a Magnetically Stabilized Fluidized Bed", Biotechnology Progress 1(2) page 95–103.

Burns et al (1985:2) "Dried Calcium Alginate/Magnetite Spheres: A New Support for Chromatographic Separations and Enzyme Immobilization" Biotechnology and Bioengineering 27, page 137–145.

Porath et al (1971) "Agar derivatives for chromatogrphy, electrophoresis and gel bound enzymes. Desulphated and reduced crosslinked agar and agarose in spherical bead form", Journal of Chromatography 60, page 167–177.

Levenspiel (1972) "Chemical Reaction Engineering", Second Edition. John Wiley & Sons.

What is claimed is:

1. In a fluidized bed chromatographic process for purification and binding of components in a liquid by binding said components to chromatographic beads derivitized to bind said components to said chromatographic beads in which process a fluidized bed of said chromatographic beads is formed and said liquid is passed through said fluidized bed, the improvement wherein:
   (a) said chromatographic beads are porous and comprise:
      (i) high density particles and
      (ii) a polymer matrix;
   (b) said polymer matrix is derivitized to bind said components to said chromatographic beads;
   (c) said high density particles are incorporated in said polymer matrix;
   (d) said chromatographic beads have a density of 1.10–1.50 g/ml when hydrated and a particle diameter of 100–1000 $\mu$m; and
   (e) each of the density range and the particle diameter range of said chromatographic beads is selected to provide:
      (i) desired sedimentation properties of said chromatographic beads in said liquid in the fluidized bed chromatography process and
      (ii) a stabilized fluidized bed.

2. The process according to claim 1, wherein the fluidized bed chromatographic process is a procedure selected from the group consisting of:
   ion-exchange chromatography and affinity chromatography.

3. The process according to claim 1, wherein said high density particles constitute from 5–50%, by weight, of said chromatographic beads.

4. The process according to claim 1, wherein said high density particles are made of silica or glass.

5. The process according to claim 4, wherein said silica is quartz.

6. The process according to claim 1, wherein said high density particles consist of glass particles.

7. The process according to claim 1, wherein said polymer matrix comprises at least one polymer selected from the group consisting of:
   a) a natural polysaccharide selected from the group consisting of agarose, starch, cellulose, and derivitives thereof and
   b) a synthetic polymer selected from the group consisting of acrylates and methacrylates.

8. The process according to claim 1, wherein said polymer matrix is agarose.

9. The process according to claim 1, wherein said polymer matrix is derivitized with a protein.

10. The process according to claim 1, wherein said polymer matrix is derivitized to bind said components by means of cyanogen bromide.

11. The process according to claim 1, wherein the particle diameter is 100–500 $\mu$m.

12. The process according to claim 1, wherein:
   (a) said process is useful for purification and binding proteins and
   (b) the particle diameter is 100–500 $\mu$m.

13. The process according to claim 1, wherein the fluidized bed chromatographic process is conducted in a liquid up-flow bed reactor comprising a vertical reactor vessel having an inlet, an outlet, and a fluidized bed of said chromatographic beads.

14. In a fluidized bed chromatographic process for purification and binding of components in a liquid by binding said components to chromatographic beads derivitized to bind said components to said chromatographic beads in which process a fluidized bed of said chromatographic beads is formed and said liquid is passed through said fluidized bed, the improvement wherein:
   (a) said chromatographic beads are porous and comprise:
      (i) high density particles and
      (ii) a polymer matrix;
   (b) said polymer matrix is derivitized to bind said components to said chromatographic beads;
   (c) said high density particles are incorporated in said polymer matrix;
   (d) said chromatographic beads have a particle diameter of 100–1000 $\mu$m; and
   (e) the particle diameter range of said chromatographic beads is selected to provide:
      (i) desired sedimentation properties of said chromatographic beads in said liquid in the fluidized bed chromatographic process and
      (ii) a stabilized fluidized bed.

15. The process according to claim 14, wherein the fluidized bed chromatographic process is a procedure selected from the group consisting of:
   ion-exchange chromatography and affinity chromatography.

16. The process according to claim 14, wherein said high density particles constitute from 5–50% by weight, of said chromatographic beads.

17. The process according to claim 14, wherein said high density particles are made of silica or glass.

18. The process according to claim 17, wherein said silica is quartz.

19. The process according to claim 14, wherein said high density particles consist of glass particles.

20. The process according to claim 14, wherein said polymer matrix comprises at least one polymer selected from the group consisting of:
   a) a natural polysaccharide selected from the group consisting of agarose, starch, cellulose, and derivitives thereof; and b) a synthetic polymer selected from the group consisting of acrylates and methacrylates.

21. The process according to claim 14, wherein said polymer matrix is agarose.

22. The process according to claim 14, wherein said polymer matrix is derivitized with a protein.

23. The process according to claim 14, wherein said polymer matrix is derivitized to bind said components by means of cyanogen bromide.

24. The process according to claim 14, wherein the particle diameter is 100–500 μm.

25. The process according to claim 14, wherein:
   (a) said process is useful for purification and binding proteins, and
   (b) the particle diameter is 100–500 μm.

26. The process according to claim 14, wherein the fluidized bed chromatographic process is conducted in a liquid up-flow bed reactor comprising a vertical reactor vessel having an inlet, an outlet, and a fluidized bed of said chromatographic beads.

* * * * *

UNITED STATES PATENT AND TRADEMARK OFFICE
CERTIFICATE OF CORRECTION

PATENT NO. : 6,325,937 B1
DATED : December 4, 2001
INVENTOR(S) : Mats Carlsson et al.

It is certified that error appears in the above-identified patent and that said Letters Patent is hereby corrected as shown below:

Column 1,
Line 30, "haste been used" should read -- has been used --;
Line 42, "same-probability" should read -- same probability--.

Column 2,
Line 32, "do not fulfil" should read -- do not fulfill --;
Line 44, "are provided,which" should read -- are provided, which --.

Column 3,
Line 5, "well beads of should read -- well as beads of --;
Line 63, "a Stabilized" should read -- a stabilized --.

Column 4,
Line 1, "particles etc have" should read -- particles, etc., have --;
Line 64, "urine etc from" should read -- urine, etc., from --.

Column 5,
Line 24, "of she weight" should read -- of the weight --.

Column 7,
Line 41, "NGQ 200." should read -- NGQ 200, --.

Column 8,
Lines 47-48, delete and replace with
-- EXAMPLE 9
Characterization of the Fluidized Bed Stability --.
Line 61, "definitionssee" should read -- definitions see --.

UNITED STATES PATENT AND TRADEMARK OFFICE
CERTIFICATE OF CORRECTION

PATENT NO. : 6,325,937 B1
DATED : December 4, 2001
INVENTOR(S) : Mats Carlsson et al.

It is certified that error appears in the above-identified patent and that said Letters Patent is hereby corrected as shown below:

Column 9,
Line 41, "chromatography" should read -- chromatographic --.

Signed and Sealed this

Eleventh Day of March, 2003

JAMES E. ROGAN
*Director of the United States Patent and Trademark Office*